(12) United States Patent
Babin

(10) Patent No.: US 7,845,936 B2
(45) Date of Patent: Dec. 7, 2010

(54) SEALING ARRANGEMENT FOR AN EDGE GATED NOZZLE IN AN INJECTION MOLDING SYSTEM

(75) Inventor: Denis Babin, Georgetown (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 138 days.

(21) Appl. No.: 12/356,559

(22) Filed: Jan. 21, 2009

(65) Prior Publication Data

US 2010/0183762 A1 Jul. 22, 2010

(51) Int. Cl.
*B29C 45/22* (2006.01)
(52) U.S. Cl. ................................ 425/572; 425/573
(58) Field of Classification Search ............ 425/572, 425/573
See application file for complete search history.

(56) References Cited

U.S. PATENT DOCUMENTS

| | | | |
|---|---|---|---|
| 2,770,011 A | 11/1956 | Kelly | |
| 3,113,346 A | 12/1963 | Bright | |
| 3,491,408 A | 1/1970 | Natkins | |
| 3,535,742 A | 10/1970 | Marcus | |
| 3,553,788 A | 1/1971 | Putkowski | |
| 3,822,856 A | 7/1974 | Gellert | |
| 4,212,624 A | 7/1980 | Ando et al. | |
| 4,292,018 A * | 9/1981 | Beale | 425/572 |
| 4,344,750 A | 8/1982 | Gellert | |
| 4,345,892 A | 8/1982 | Schulte et al. | |
| 4,818,217 A | 4/1989 | Schmidt et al. | |
| 4,836,766 A | 6/1989 | Gellert | |
| 4,902,218 A | 2/1990 | Leonard et al. | |
| 4,981,431 A | 1/1991 | Schmidt | |
| 5,049,062 A | 9/1991 | Gellert | |
| 5,051,086 A | 9/1991 | Gellert | |
| 5,268,184 A | 12/1993 | Gellert | |
| 5,269,676 A | 12/1993 | Gellert | |

(Continued)

FOREIGN PATENT DOCUMENTS

CA     2441139 A1     3/2005

(Continued)

OTHER PUBLICATIONS

HTS Hot Runner Systems Brochure, "Edge Gate Technology for Micromolding", Dec. 2000.

(Continued)

*Primary Examiner*—Tim Heitbrink
(74) *Attorney, Agent, or Firm*—Medler Ferro PLLC

(57) ABSTRACT

An injection molding apparatus having a sealing arrangement between a hot runner manifold and edge-gated nozzle that accommodates thermal expansion during operation is disclosed. A spacer element is axially fixed in position between the manifold and a mold plate in which the nozzle sits. The nozzle includes a reduced diameter spigot portion on an upstream end that is in a telescopic/slidable relationship with a bore of the spacer element. The nozzle includes radially extended nozzle tips axially fixed in position at a downstream end of the nozzle that are in fluid communication with respective mold gates and corresponding mold cavities. In the cold condition, a gap G exists between a shoulder of the nozzle proximate the spigot portion and a corresponding surface of the spacer element bore. Under operating conditions, thermal expansion of the nozzle is accommodated in a direction of the manifold by the gap.

23 Claims, 10 Drawing Sheets

U.S. PATENT DOCUMENTS

| | | |
|---|---|---|
| 5,269,677 A | 12/1993 | Gauler |
| 5,282,735 A * | 2/1994 | Gellert ........................ 425/572 |
| 5,494,433 A | 2/1996 | Gellert |
| 5,536,165 A | 7/1996 | Gellert |
| 5,591,465 A | 1/1997 | Babin |
| 5,609,893 A | 3/1997 | Eastwood |
| 5,720,995 A | 2/1998 | Gellert |
| 5,780,077 A | 7/1998 | von Holdt |
| 5,820,899 A | 10/1998 | Gellert et al. |
| 5,935,616 A * | 8/1999 | Gellert et al. ................ 425/572 |
| 5,952,016 A | 9/1999 | Gellert |
| 6,666,675 B2 | 12/2003 | Ihara et al. |
| 6,688,875 B2 | 2/2004 | Babin |
| 6,805,549 B2 | 10/2004 | Gunther |
| 6,835,060 B2 | 12/2004 | Sicilia |
| 6,860,732 B2 | 3/2005 | Babin et al. |
| 7,252,498 B2 | 8/2007 | Olaru |
| 2004/0156944 A1 | 8/2004 | Olaru |
| 2004/0197437 A1 | 10/2004 | Olaru |
| 2005/0019444 A1 | 1/2005 | Sicilia et al. |
| 2005/0196486 A1 | 9/2005 | Babin et al. |
| 2005/0238748 A1 | 10/2005 | Jenko |
| 2008/0279978 A1 | 11/2008 | Babin et al. |

FOREIGN PATENT DOCUMENTS

| | | |
|---|---|---|
| DE | 76 03 206 U | 6/1976 |
| DE | 33 38 783 C1 | 3/1985 |
| DE | 35 01 840 C2 | 7/1986 |
| DE | 42 15 601 A1 | 11/1993 |
| DE | 44 04 894 C1 | 1/1998 |
| DE | 100 08 722 A1 | 8/2001 |
| DE | 101 50 419 A1 | 5/2003 |
| DE | 103 07 989 A1 | 9/2003 |
| EP | 0 070 925 A1 | 2/1983 |
| EP | 0 841 142 B1 | 3/2000 |
| JP | 51-103151 | 9/1976 |
| JP | 55-31604 U | 2/1980 |
| JP | 58-14728 A | 1/1983 |
| JP | 1-141017 U | 9/1989 |
| JP | 10-166393 A | 6/1998 |
| JP | 2004-330672 A | 11/2004 |
| JP | 2005-041020 A | 2/2005 |
| JP | 2005-132026 A | 5/2005 |
| WO | WO-96/21548 | 7/1996 |
| WO | WO-2007/051857 A2 | 5/2007 |

OTHER PUBLICATIONS

Schottli Brochure, "Heisskanal-Systeme", Oct. 1997.
European Search Report; EP 10 00 0415 (Aug. 3, 2010).

* cited by examiner

SEALING ARRANGEMENT FOR AN EDGE GATED NOZZLE IN AN INJECTION MOLDING SYSTEM

FIELD OF THE INVENTION

The invention relates generally to an injection molding system and, in particular, to a sealing arrangement between a hot runner manifold and nozzle of the system to accommodate thermal expansion.

BACKGROUND OF THE INVENTION

In a multi-cavity injection molding apparatus having a hot runner manifold for delivering a melt stream of moldable material to a plurality of hot runner nozzles. Heat expansion can cause the manifold to warp. As a result, the distance between the lower surface of the manifold and each of a plurality of mold cavities varies and thus each nozzle is subjected to unique operating conditions depending on the nozzle's location relative to the manifold. As such, the thermal expansion results in a variable sealing force being applied to both the interface between the nozzle and manifold and the nozzle and mold gate. If the manifold "floats" where a head of the nozzle is in contact with the lower surface of the manifold but not attached to it, an uneven sealing condition may allow the pressurized melt to leak at the interface between the manifold and each nozzle and/or in the mold gate area around the nozzle seals. If the nozzles are threaded into the manifold, an uneven sealing condition may still allow the pressurized melt to leak in the mold gate area.

Many nozzle designs rely on thermal expansion of the nozzle to provide sealing at the mold gate and at the nozzle/manifold interface, which can be aided by the use of one or more pressure disks between a back plate and an upstream surface of the manifold. However in an injection molding apparatus having edge gated nozzles, which are nozzles having a number of radially extending or horizontal tips, the radially extending tips are generally axially fixed in position to align with the mold gate and therefore the conventional edge gated nozzle may be prevented from thermal expansion in a longitudinal direction. With the radially extending tips axially fixed in position, leakage may occur between the tip and mold gate or the tip and nozzle due to the large amount of force acting on the tips under operating conditions. Leakage may also occur at the nozzle and manifold interface because in a conventional edge gated system that does not allow for thermal expansion of the nozzle, pressure disks that usually provide sealing support at this interface are ineffective, as such pressure disks do not work without the changes in force experienced by thermal expansion of the nozzle.

Although solutions exist in the art for addressing sealing in edge gated injection molding systems, a need still exists for a sealing connection between a hot runner manifold and an edge gated nozzle that accommodates thermal expansion of the nozzle and some deflection of the manifold without causing a variable or excessive force being applied between the nozzle and the manifold or the nozzle and a mold gate of an injection molding system.

BRIEF SUMMARY OF THE INVENTION

Embodiments hereof are directed to an injection molding apparatus having a sealing arrangement between a hot runner manifold and edge-gated nozzle that accommodates thermal expansion during operation. A spacer element is axially fixed in position between the manifold and a mold plate, wherein the nozzle sits within an opening of the mold plate. The nozzle includes a reduced diameter spigot portion on an upstream end that is in a telescopic/slidable relationship with a bore of the spacer element. The nozzle includes radially extended nozzle tips axially fixed in position at a downstream end of the nozzle that are in fluid communication with respective mold gates and corresponding mold cavities. In the cold condition, a gap G exists between a shoulder of the nozzle proximate the spigot portion and a corresponding surface of the spacer element bore. Under operating conditions with the spacer element and nozzle tips being axially fixed in position, thermal expansion of the nozzle is accommodated in a direction of the manifold by the gap.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Directional terms are used in the following description with respect to a position or direction relative to a stationary platen of an injection molding machine. "Forward" or "front" are a position distant from or in a direction away from the stationary platen. "Rearward" and "back" are a position near or in a direction toward the stationary platen. In addition, "upstream" and "downstream" refer to the direction of flow of a melt stream of moldable material.

Figure 1:
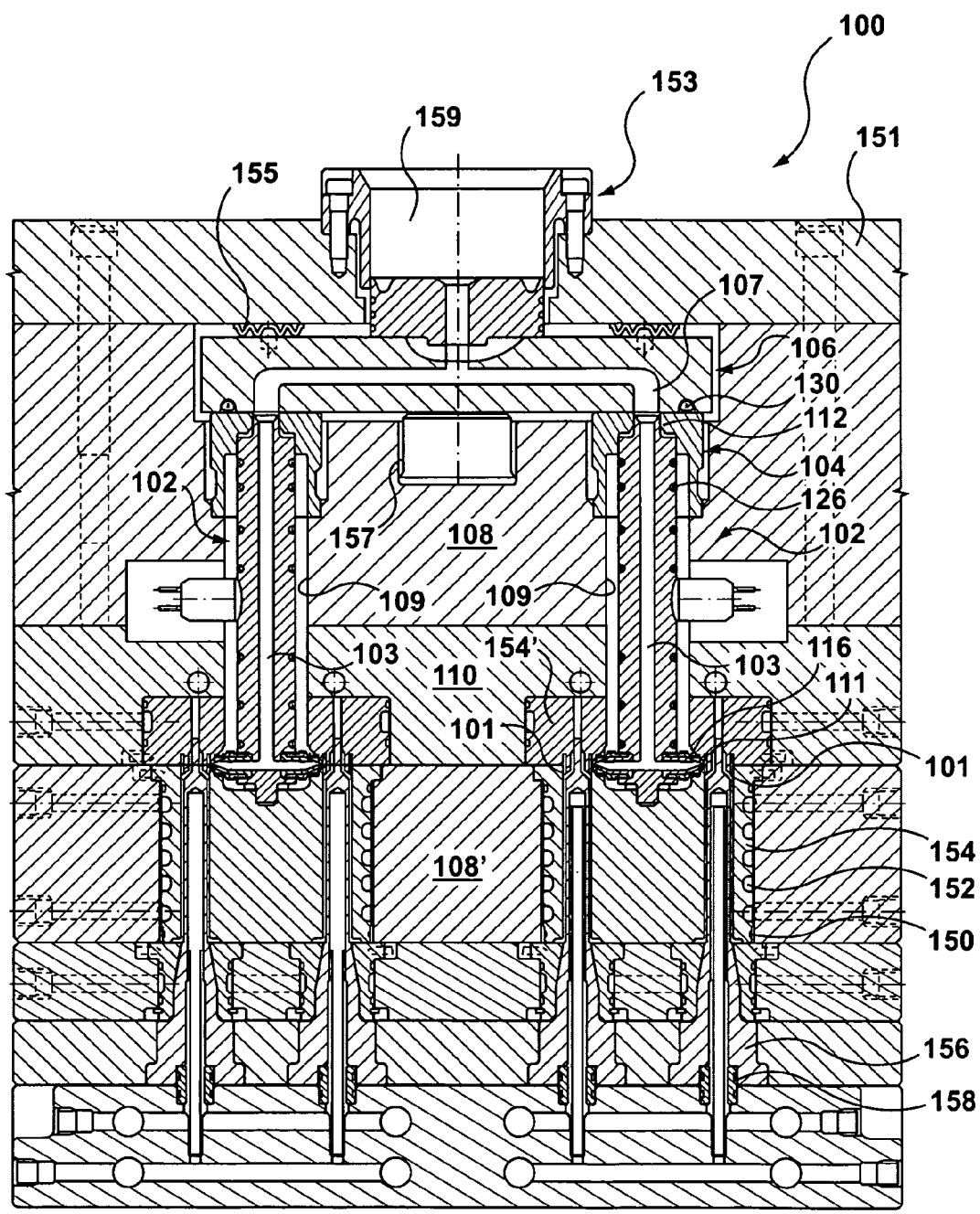
FIG. 1 is a cross-sectional view of an edge-gated injection molding apparatus according to an embodiment of the present invention.

FIG. 1 is a cross-sectional view of a multi-cavity edge-gated injection molding apparatus 100 according to an embodiment of the present invention. Generally, edge-gated injection molding apparatus 100 includes several nozzles 102, two of which are shown in FIG. 1, that are coupled to a hot runner manifold 106 to receive a melt stream of moldable material therefrom.

Each nozzle 102 is mounted in an opening 109 in mold plates 108, 110 and includes a nozzle melt channel 103 for receiving the melt stream from a manifold melt channel 107 and delivering the melt stream to mold cavities 101 via mold gates 111. Nozzles 102 include nozzle heaters 126 that are monitored and controlled by independent thermocouples (not shown), and manifold 106 includes a manifold heater 130. Nozzle heaters 126 and manifold heater 130 are provided to maintain the melt stream of moldable material within melt channels 103, 107, respectively, at a proper processing temperature.

Mold cavities 101 are formed between respective cavity inserts 154, 154' and mold cores 156. Cavity insert 154 is disposed within mold plate 108' and includes seals 150 and cooling channels 152 therebetween. Cavity insert 154' is disposed within mold plate 110. Each mold core 156 is held in place by a mold insert 158. Mold cavities 101 are radially spaced around nozzle 102 and a nozzle tip 116 that is coupled to a downstream end of nozzle 102 is aligned with a respective mold gate 111. As such, the location of nozzle tips 116 is generally fixed relative to mold plates 108, 110 and 108'.

As illustrated in FIG. 1, manifold 106 is spaced from a back plate 151 and mold plate 108 by an insulative air space that is maintained therebetween by pressure disks 155 and a locating ring 157. Pressure disks suitable for use in embodiments hereof are disclosed in U.S. Pat. No. 5,125,827 to Gellert, which is incorporated by reference herein in its entirety. A sprue bushing 153 is fixed to back plate 151 and includes a melt inlet 159 that permits a sliding/telescopic connection with manifold 106. This connection accommodates some thermal expansion of manifold 106 and nozzle 102 in an axial direction. However, axial thermal expansion of nozzle 102 is restricted in a direction of mold cavities 101 by the relatively fixed position of nozzle tips 116. In order to prevent nozzle tips 116 from bearing the load of both manifold 106 and edge-gated nozzle 102 during operation of injection molding apparatus 100, nozzle 102 includes a spigot portion 112 that is in a sliding/telescopic arrangement with a spacer element 104 that is axially fixed in position between manifold 106 and mold plate 108, as described in more detail below. Due to the strenuous and repetitive nature of the injection molding process, such an arrangement between manifold 106 and nozzles 102 accommodates a load condition that may otherwise cause misalignment of nozzle tips 116 with their respective mold gates 111 and/or excessive wear of nozzle tips 116 and thereby prevents leakage and reduces repair and maintenance of these components.

Figure 2:
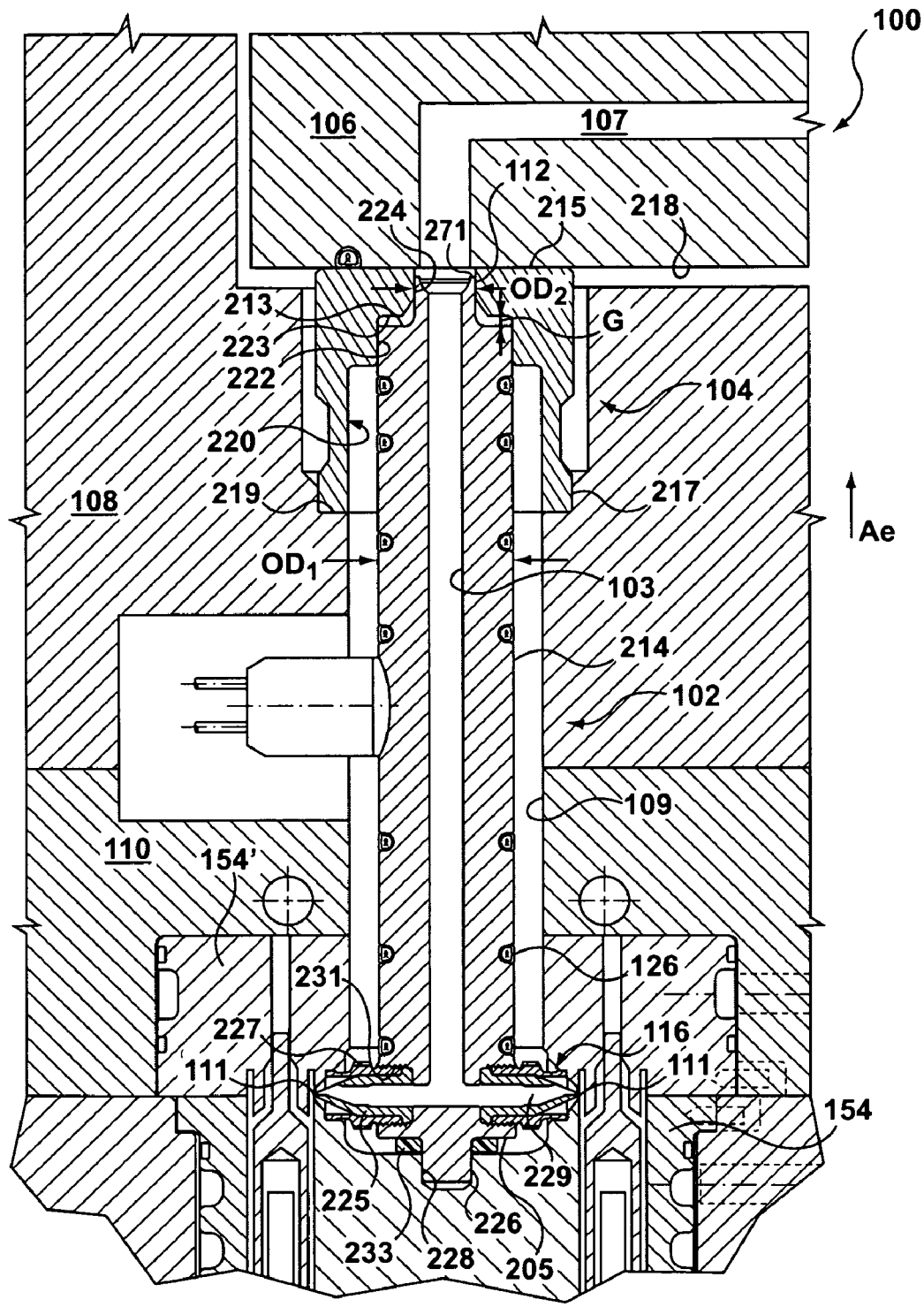
FIG. 2 is an enlarged view of a portion of the injection molding apparatus of FIG. 1.

FIG. 2 is an enlarged view of a portion of injection molding apparatus 100 of FIG. 1. Nozzle 102 includes a nozzle body portion 214 that is defined between nozzle spigot portion 112 and a downstream end 205 of nozzle 102 with nozzle melt channel 103 being centrally disposed through both spigot portion 112 and nozzle body portion 214. Nozzle tips 116 radially extend from downstream end 205 of nozzle body portion 214. Each nozzle tip 116 includes a nozzle tip component 225 having a melt channel 229 for delivering the melt stream from nozzle melt channel 103 to mold cavity 101 via mold gate 111 and a transfer seal component 227 that retains nozzle tip component 225 to nozzle body portion 214. In the arrangement shown in FIG. 2, each transfer seal component 227 includes threads for engaging corresponding threads within a side bore 231 of nozzle body portion 214. Each transfer seal component 227 is in contact with an area of mold cavity inserts 154, 154' that surrounds mold gate 111 to align nozzle tip component 225 with mold gate 111 and seal against melt leakage around mold gate 111. Extending from downstream end 205 of nozzle body portion 214 is a central locator post 226 that fits within a corresponding recess 228 in cavity insert 154 for aligning nozzle tips 116 with mold gates 111. Central locator post 226 assures a proper height of nozzle tips 116 with respect to mold gates 111 to permit proper centering thereof. An insulative annular component 233 surrounding central locator post 226 is positioned between downstream end 205 of nozzle body portion 214 and cavity insert 154. It would be understood by one of skill in the art of mold design that mold cavity 101 could be formed by one or more mold cavity plates rather than by mold cavity inserts 154, 154' without departing from the scope of the present invention. In such an alternate design, a transfer seal component would contact an area of the mold cavity plates around the mold gate and be aligned therewith in a manner as previously discussed.

Although nozzle tips 116 are shown extending directly from, or in-line with, the radially extended portion of nozzle melt channel 103 and normal to the side surface of nozzle body portion 214, it should be understood that nozzle tips 116 may extend at any angle from the radially extended portion of nozzle melt channel 103 and/or the side or forward surface of nozzle body portion 214 without departing from the scope of the present invention. An exemplary two-piece nozzle seal arrangement that may be used in embodiments of the present invention is disclosed in U.S. Pat. No. 5,299,928 to Gellert, which is incorporated by reference herein in its entirety.

Spacer element 104 has an upstream surface 215 that contacts a downstream surface 218 of manifold 106 and has a downstream end 217 disposed within an annular seat 219 in mold plate 108 to be axially fixed in position. Downstream end 217 is the only portion of spacer element 104 that makes contact with mold plate 108 to minimize heat loss from manifold 106 and nozzle 102. An inner surface of spacer element 104 defines a stepped bore 220 having a first bore portion 222 of a first diameter $ID_1$ that slidably receives an upstream end of nozzle body portion 214 of an outer diameter $OD_1$. Spacer element stepped bore 220 also defines a second bore portion 224 of a second diameter $ID_2$, which is less than $ID_1$, that slidably receives spigot portion 112 of an outer diameter $OD_2$, which is less than $OD_1$. A planar surface 223 is defined between first and second bore portions 222, 224 and a corresponding shoulder 213 is defined between spigot portion 112 and nozzle body portion 214. In a cold condition, i.e., when injection molding apparatus 100 is below an operating temperature, a gap G that is sized to accommodate thermal expansion of injection molding system 100 exists between nozzle shoulder 213 and planar surface 223 of spacer element bore 220. Accordingly, in the cold condition an upstream end 271 of spigot portion 112 is spaced from downstream surface 218 of manifold 106 in order to allow for sliding movement of spigot portion 112 within second bore portion 224 as the system is brought to an operating temperature, as discussed below.

During operation, thermal expansion of manifold 106 and nozzles 102 in an axial direction is provided for by the gap G between nozzle 102 and spacer element bore 220. In such an arrangement, requisite axial thermal expansion is accommodated by having a sliding/telescopic arrangement between spacer element 104 and nozzle 102, and particularly with reference to the embodiment in FIG. 2, spigot portion 112 and the upstream end of nozzle body portion 214 may slide within spacer element first and second bore portions 222, 224, respectively thereby moving upstream end 271 of spigot portion 112 closer to or in contact with downstream surface 218 of manifold 106. With axial thermal expansion of nozzle 102 being restricted in a direction of mold cavities 101 by central locator post 226, the thermal expansion of nozzle 102 occurs substantially in the direction of arrow $A_E$ in FIG. 2. Consequently, nozzle tips 116 do not bear the load of both manifold 106 and nozzle 102 during operation of injection molding apparatus 100. Another feature of utilizing spacer element 104 in this manner is that it permits front mounting of nozzle 102.

FIGS. 3-8 are similar to injection molding apparatus 100 of FIG. 1 but include various modifications in accordance with further embodiments of the present invention. Features that appear in FIGS. 3-8 that are the same as those previously described with reference to the embodiment of FIGS. 1 and 2 will not be further described below.

Figure 3:
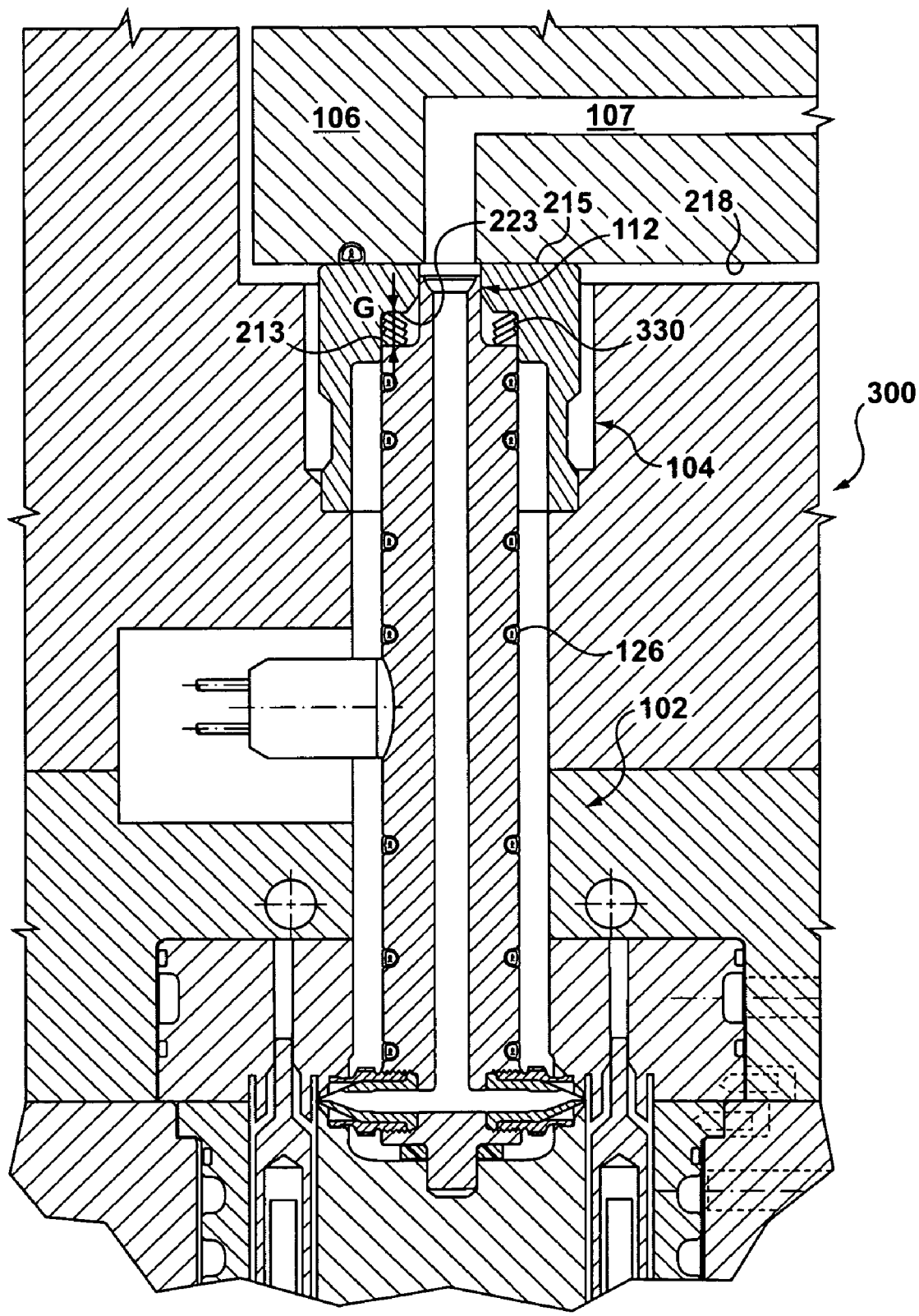
FIG. 3 is the injection molding apparatus of FIG. 2 modified in accordance with another embodiment of the present invention.

In the embodiment of FIG. 3, injection molding apparatus 300 includes a biasing member 330 positioned within gap "G" between nozzle shoulder 213 and spacer element annular seat 223. Biasing member 330 helps to maintain sealing contact between upstream surface 215 of spacer element 104 and downstream surface 218 of manifold 106 before and during operation. Biasing member 330 may be a spring as shown in FIGS. 3, 5, 7 and 8 or in other embodiments may be a bevel washer or a metallic o-ring as shown in FIG. 8B.

Figure 4:
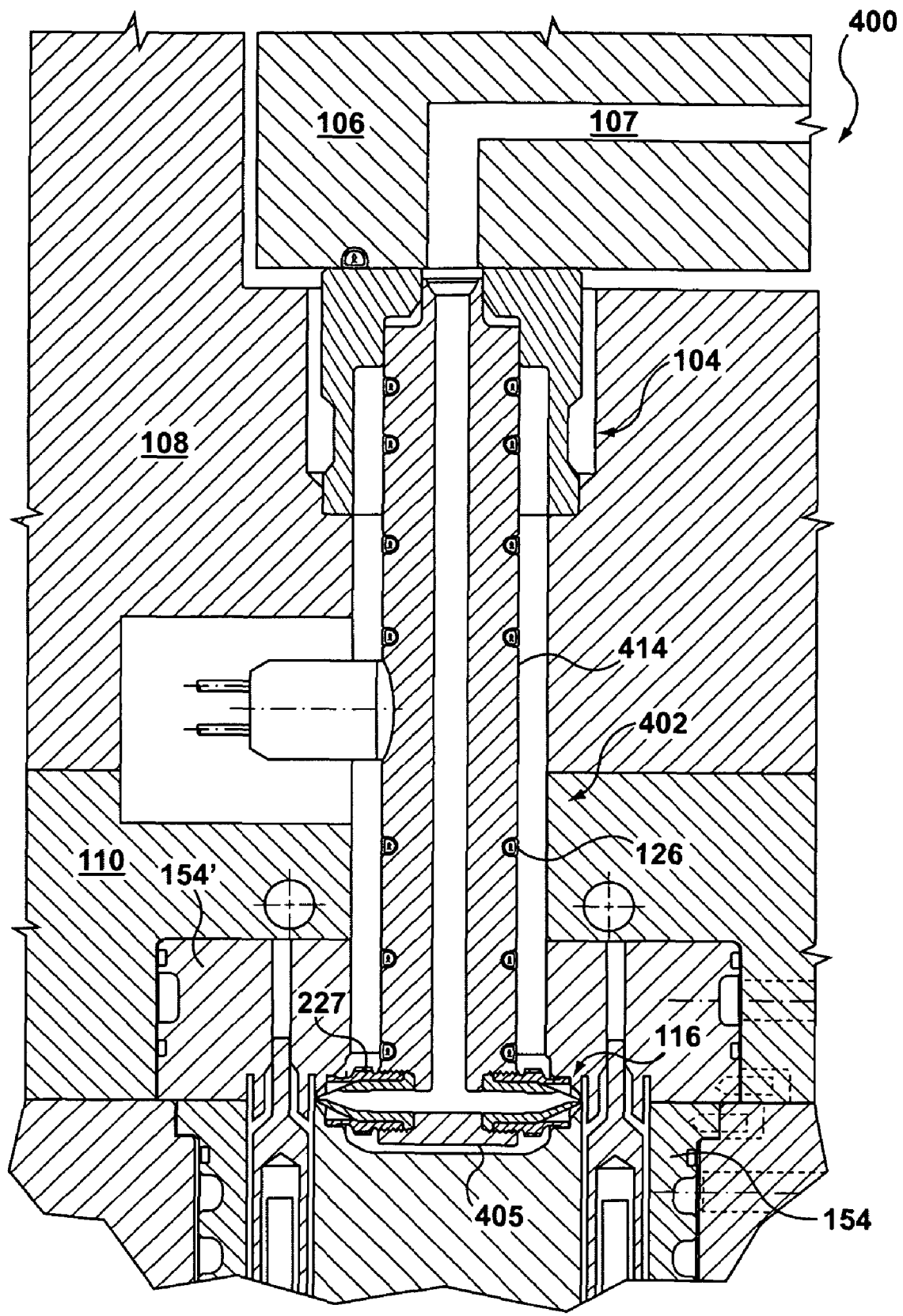
FIG. 4 is the injection molding apparatus of FIG. 2 modified in accordance with another embodiment of the present invention.

In the embodiment of FIG. 4, injection molding apparatus 400 includes a nozzle 402 having a nozzle body portion 414 without a central locator post extending from a distal end 405 thereof. As such, nozzle 402 does not make contact with mold plates 108, 110 or cavity inserts 154, 154' except through nozzle tips 116 and spacer element 104 thereby minimizing heat loss therefrom. Axial thermal expansion of nozzle 402 is restricted in a direction of mold cavities 101 by engagement of transfer seals 227 with mold cavity inserts 154, 154'.

Figure 5:
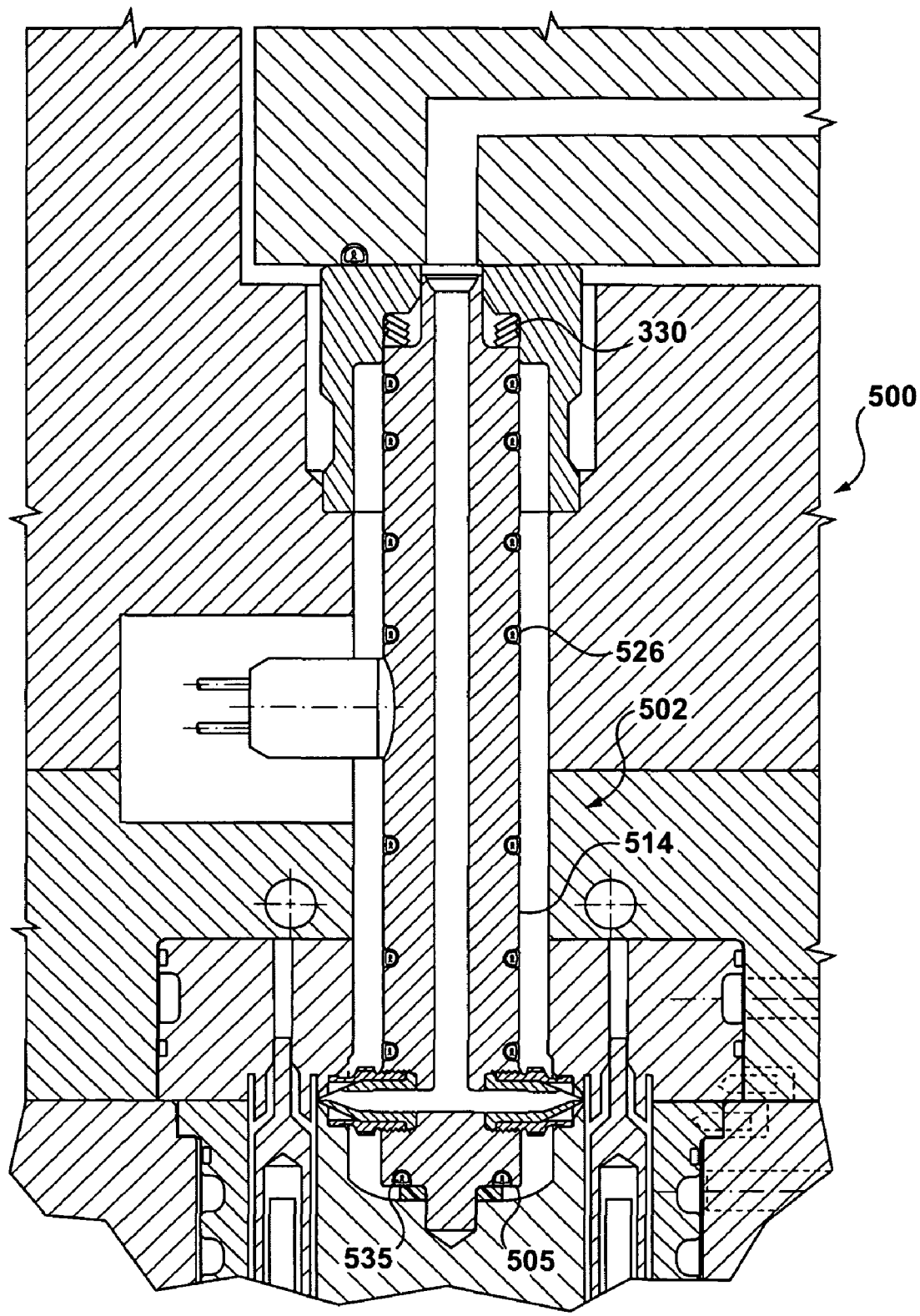
FIG. 5 is the injection molding apparatus of FIG. 2 modified in accordance with another embodiment of the present invention.

In the embodiment of FIGS. 2-4, nozzle heaters 126 have heating elements that are positioned in a groove within nozzle body portions 214, 414 that extends from an upstream end of nozzle body portion 214 to nozzle tips 116. In the embodiment of FIG. 5, nozzle 502 has a nozzle heater 526 that includes a heating element segment 535 in a groove within downstream end 505 of nozzle body portion 514.

Figure 6:
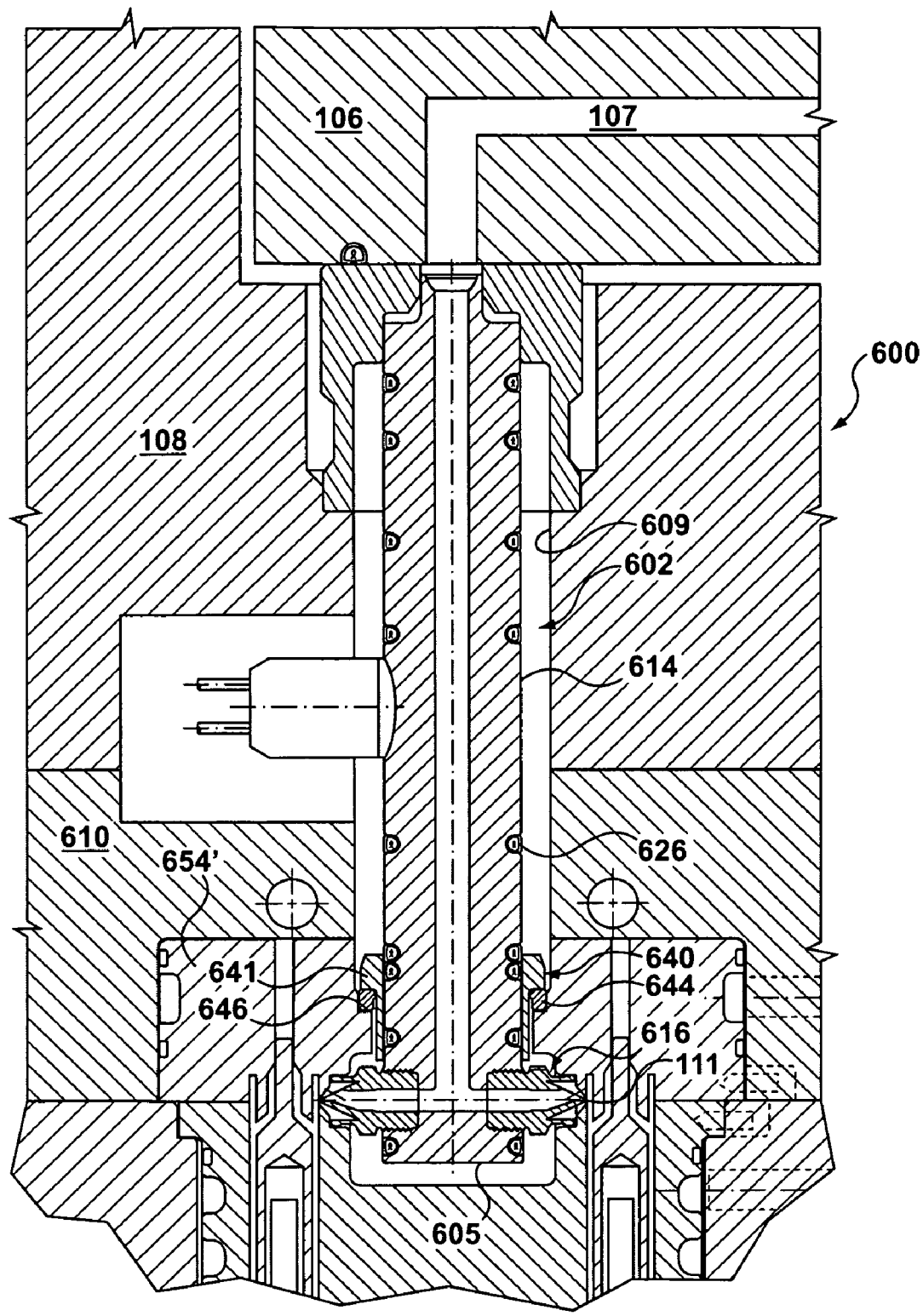
FIG. 6 is the injection molding apparatus of FIG. 2 modified in accordance with another embodiment of the present invention.

In the embodiment of FIG. 6, nozzle 602 includes a groove within nozzle body portion 614 that extends from an upstream end of nozzle body portion 614 to downstream of nozzle tips 616. Accordingly, nozzle heater 626 has a heating element segment that is positioned in the groove downstream of nozzle tips 616. Similar to nozzle 402 of injection molding apparatus 400, nozzle 602 has a nozzle body portion 614 without a central locator post extending from a distal end 605 thereof. However, in the embodiment of FIG. 6 each of nozzle tips 616 is a single component that is directly coupled to a respective side of nozzle body portion 614, either by threads or brazing, and does not include a transfer seal piece. Nozzle tips 616 contact the mold component proximate mold gates 111 to assure alignment of nozzle tips 616 with mold gates 111. In order to maintain alignment of nozzle 602 within opening 109 and, in particular, to assure alignment of nozzle tips 616 with mold gates 111, a locator sleeve 640 surrounds nozzle body portion 614 upstream of nozzle tips 616. Locator sleeve 640 has a circumferential projection 641 for engaging annular seat 646 in mold cavity insert 654'. In various embodiments, locator sleeve 640 may be made of H13 or tool steel. An optional insulator ring 644 is shown positioned between locator sleeve circumferential projection 641 and annular seat 646, which aids in preventing heat loss from nozzle 602 through locator sleeve 640.

Figure 7:
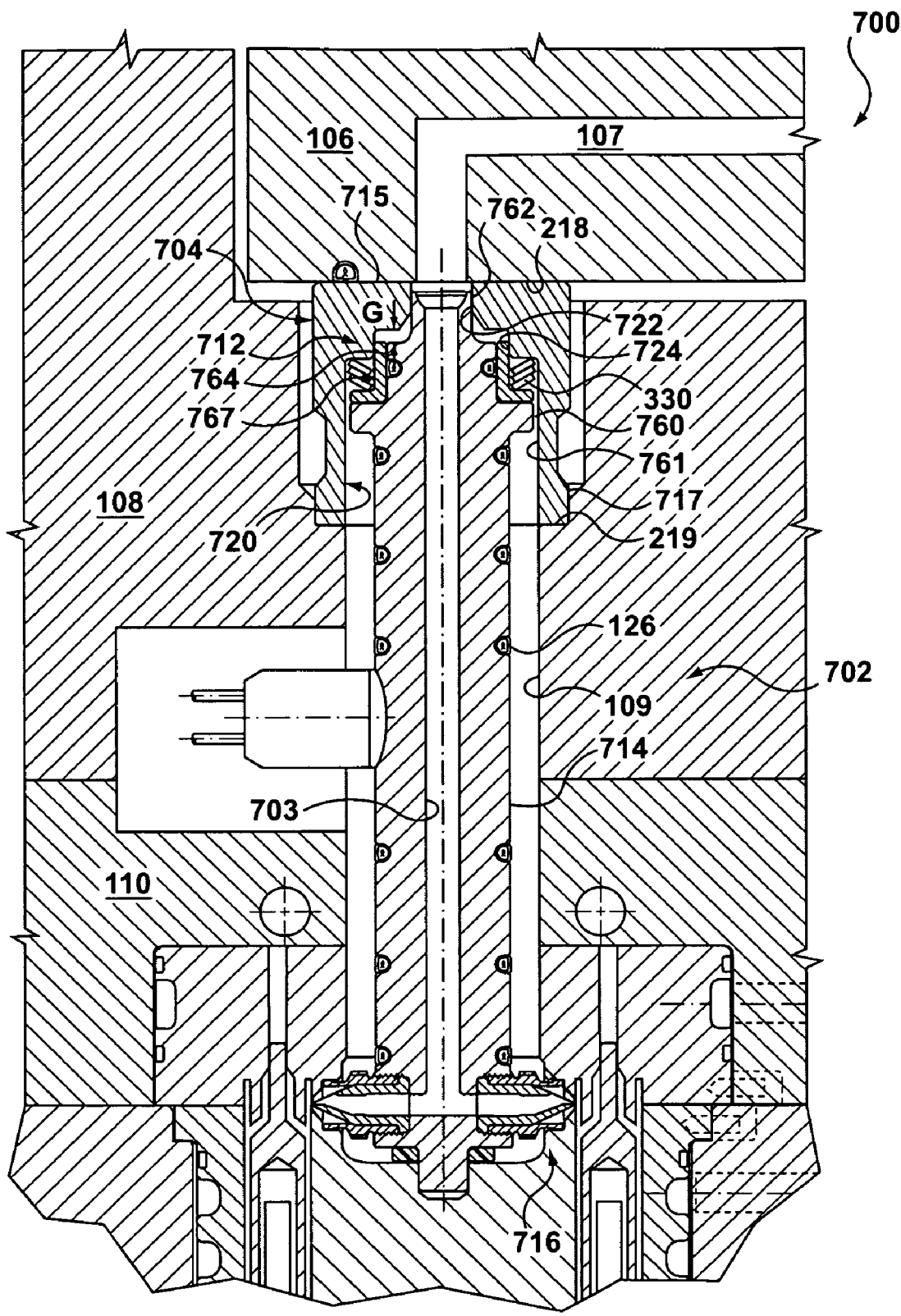
FIG. 7 is the injection molding apparatus of FIG. 2 modified in accordance with another embodiment of the present invention.
Figure 7A:
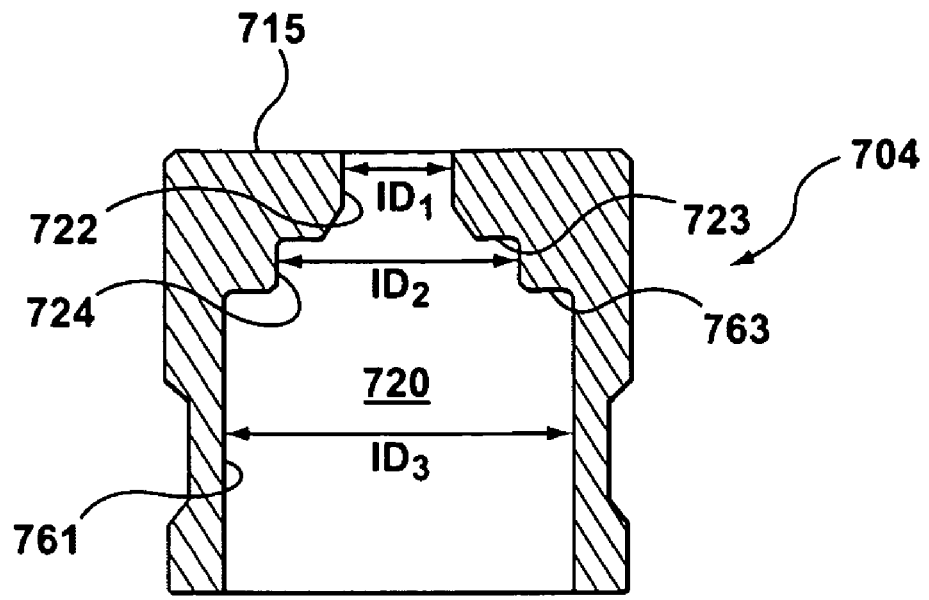
FIG. 7A is an exploded view of an upstream portion of the nozzle and spacer element of FIG. 7.
Figure 7A:
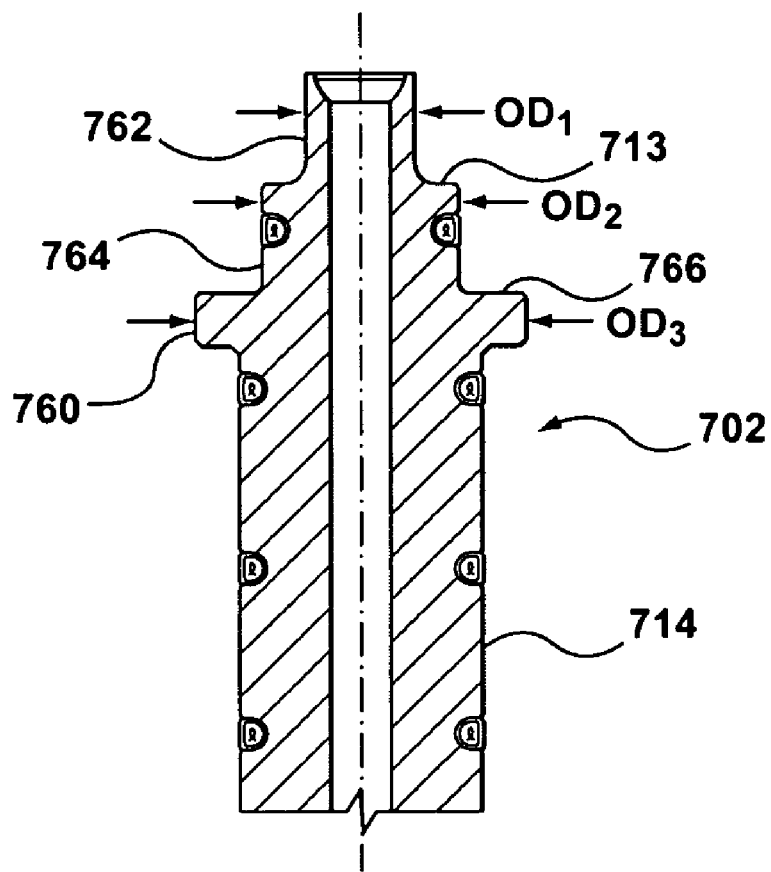
Figure 8:
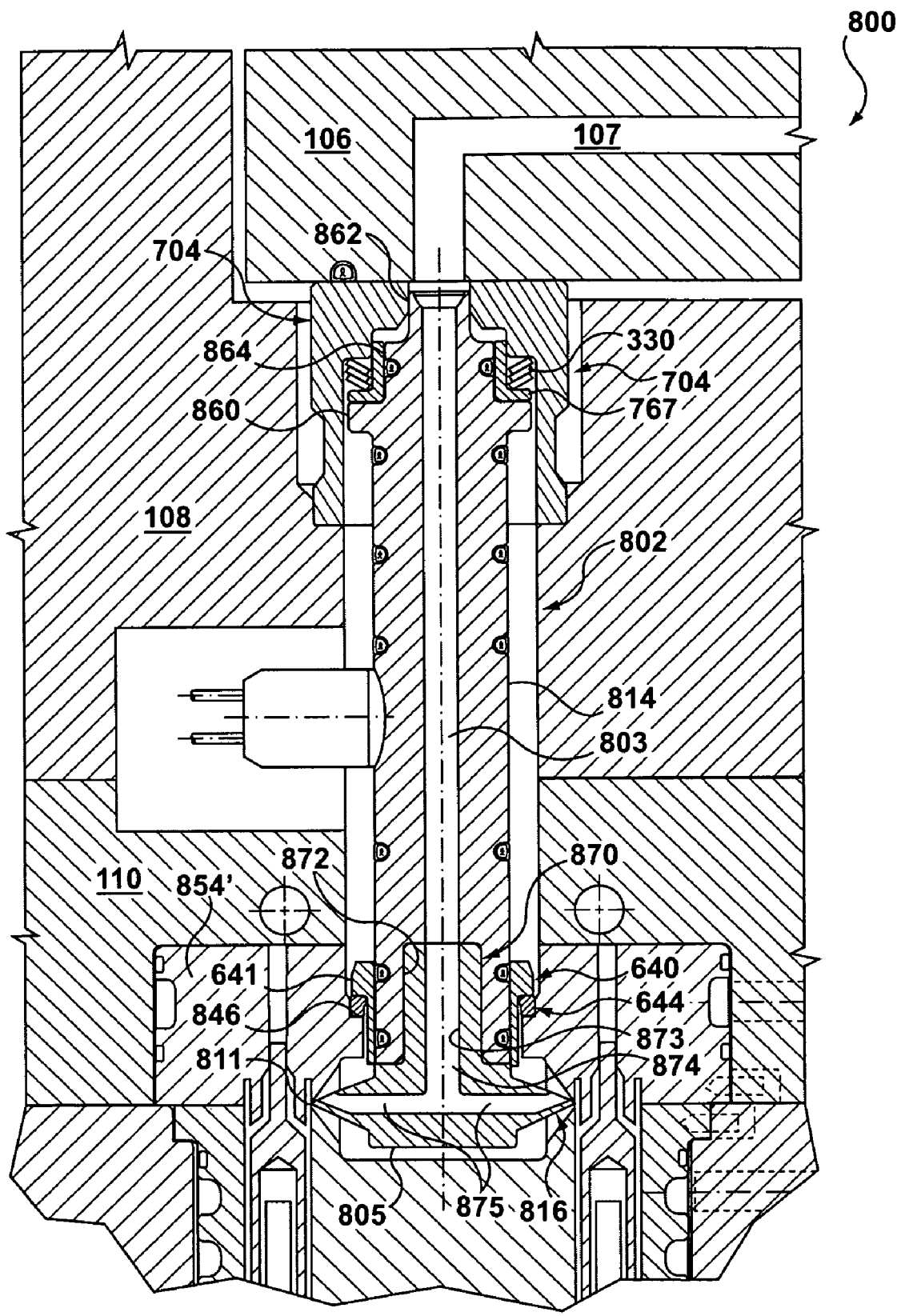
FIG. 8 is the injection molding apparatus of FIG. 7 further modified in accordance with another embodiment of the present invention.

In the embodiment shown in FIGS. 7 and 7A, nozzle 702 of injection molding system 700 includes spigot portion 712, nozzle body portion 714, and a radially extended flange portion 760 disposed between spigot portion 712 and nozzle body portion 714. Spigot portion 712 has an upstream segment 762 with a first outer diameter $OD_1$ and a downstream segment 764 with a second outer diameter $OD_2$, which is greater than $OD_1$, such that a step 713 is defined between nozzle spigot upstream and downstream segments 762, 764. Radially extended flange portion 760 has a third outer diameter $OD_3$ that is greater than $OD_2$, such that a shoulder 766 is defined between nozzle spigot downstream segment 764 and flange portion 760.

As in the previous embodiments, spacer element 704 has an upstream surface 715 that contacts and seals against downstream surface 218 of manifold 106 and a downstream surface 717 disposed within annular seat 219 in mold plate 108. Spacer element 704 has a bore 720 with at least a first portion 722 having a first diameter $ID_1$, a second portion 724 having a second inner diameter $ID_2$, and a third portion 761 having a third inner diameter $ID_3$ such that a first planar surface 723 is defined between bore first and second portions 722, 724 and a second planar surface 763 is defined between bore second and third portions 724, 761. $OD_1$ is substantially equal to $ID_1$ so that nozzle spigot upstream segment 762 is sized to be slidably received within spacer element bore first portion 722. Biasing member 330 is shown positioned between nozzle shoulder 766 and spacer element bore second planar surface 763 with an optional insulator sleeve 767 being disposed around nozzle spigot downstream segment 764 and on nozzle shoulder 766. As in the embodiment of FIG. 3, biasing element 330 helps to maintain sealing contact between upstream surface 715 of spacer element 704 and downstream surface 218 of manifold 106 before and during operation. In the embodiment of FIG. 7, insulator sleeve 767 makes contact with spacer element bore second portion 724 to aid in alignment of nozzle 702 while reducing heat loss to mold plate 108. In an embodiment without insulator sleeve 767, $OD_2$ may be substantially equal to $ID_2$ so that nozzle spigot downstream segment 764 is sized to be slidably received within spacer element bore second portion 724. $OD_3$ of flange portion 760 may be sized to be substantially equal to $ID_3$ of spacer element bore third portion 761, so that flange portion 760 assists in stabilizing and centering nozzle body portion 714 within opening 109. In an alternate embodiment, sleeve 767 may be made of a material, such as copper or a copper alloy, that expands when heated to an operating temperature to aid in sealing against spacer element 704.

When nozzle 702 is fit within spacer element bore 720 in the cold condition, a gap G exists between nozzle step 713 and spacer element bore first planar surface 723. As in the previous embodiments, under operating temperatures thermal expansion of manifold 106 and nozzle 702 in an axial direction is provided for by the gap G between nozzle 702 and spacer element bore 720. In such an arrangement, requisite axial thermal expansion is accommodated by having the sliding/telescopic arrangement between spacer element 704 and nozzle 702, and particularly with reference to the embodiment in FIG. 7, nozzle spigot upstream segment 762 may slide within spacer element bore first portion 722.

FIG. 8 is the injection molding apparatus of FIG. 7 further modified in accordance with another embodiment of the present invention. Hot runner injection molding nozzle 802 of injection molding apparatus 800 includes spacer element 704, upstream and downstream spigot portions 862, 864, and radially extended flange portion 860, each having the structure and function as described with reference to the embodiment of FIG. 7. In the embodiment of FIG. 8, however, nozzle body portion 814 includes a downstream bore 872 in which a nozzle tip insert 870 is removably coupled, such as by press fitting or by a complementary threaded connection. Radially extending from a downstream end 805 of nozzle tip insert 870 are integrally formed nozzle tips 816, two of which are shown in FIG. 8, such that a melt channel 874 of nozzle tip insert 870 has a longitudinal section 873 in fluid communication with melt channel 803 of nozzle 802 that splits into multiple radially extended sections 875 that are in fluid communication with mold gates 811. Transfer seals for assuring alignment of nozzle tips 816 with mold gates 811 are not utilized in the embodiment of FIG. 8. Instead, as utilized in the embodiment of FIG. 6, locator sleeve 640 surrounds nozzle body portion 814 upstream of nozzle tips 816. Locator sleeve 640 has circumferential projection 641 for engaging annular seat 846 in mold cavity insert 854' that in conjunction with biasing element 330 bearing down on radially extending flange 860, which biases nozzle body 814 toward annular seat 846, provide alignment of nozzle tips 816 with mold gates 811. If needed, an anti-rotation component may be utilized to prevent twisting of nozzle body 814 under operating conditions to thereby avoid any misalignment of nozzle tips 816. Optional insulator ring 644 is shown positioned between locator sleeve circumferential projection 641 and annular seat 846, which aids in preventing heat loss from nozzle 802 through locator sleeve 640.

Alternatively, nozzle 802 may be described as having a nozzle body with a first nozzle body segment 814 defining a portion of nozzle melt channel 803 and a second nozzle body segment 870 having a melt channel 874, wherein nozzle tips 816 radially extend from second nozzle body segment 870. As described above, first and second nozzle body segments 814, 870 may be threadably connected or be attached by at least one of a press fit, a shrink fit, a brazed connection and a soldered connection.

Figure 8A:
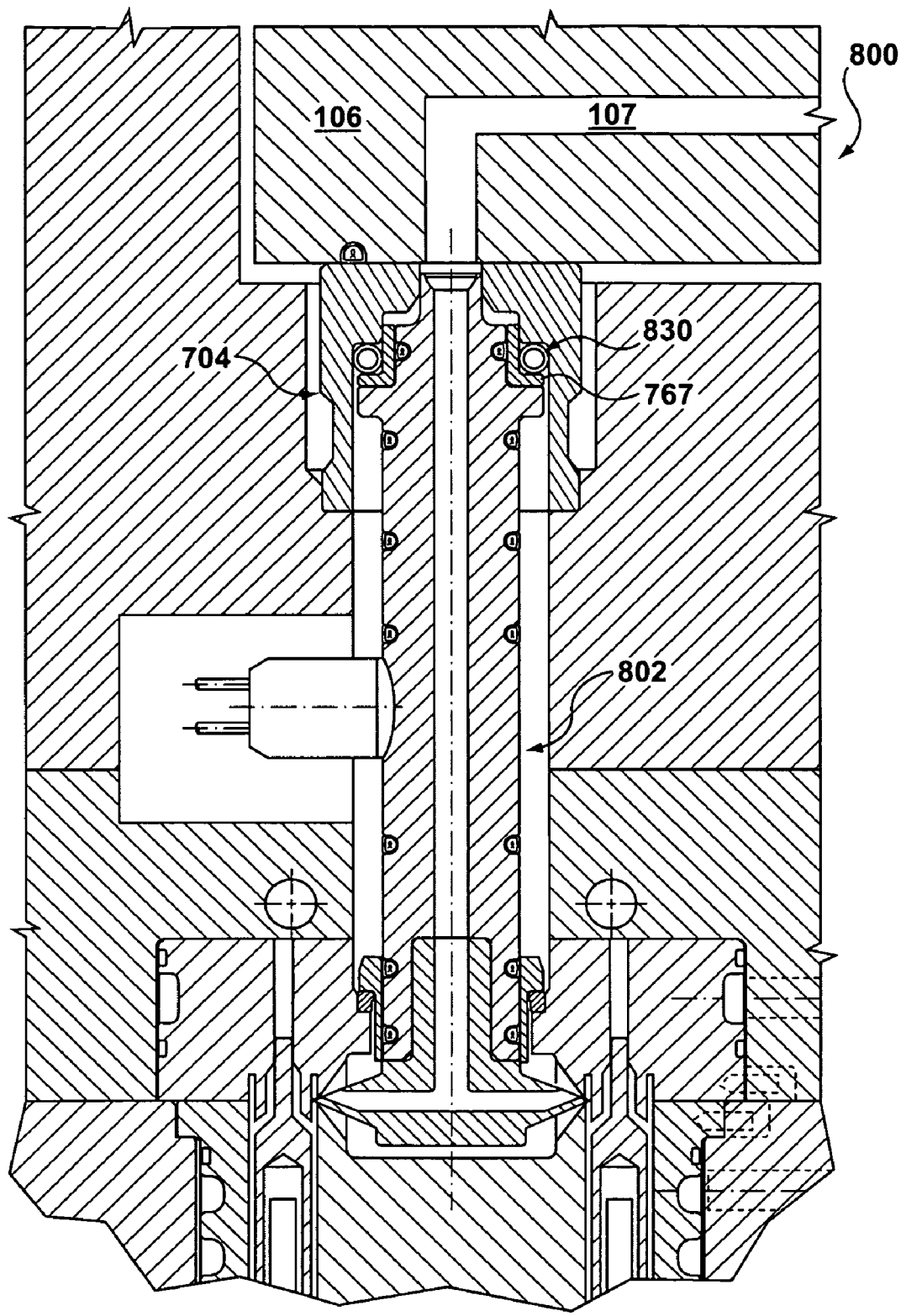
FIG. 8A is the injection molding apparatus of FIG. 8 further modified in accordance with another embodiment of the present invention.

FIG. 8 shows biasing member 330 and insulator sleeve 767 as positioned and described with reference to the embodiment of FIG. 7. In FIG. 8A, injection molding apparatus 800 includes biasing member 830, which is a metallic o-ring rather than a spring as in the previous embodiments, that is positioned between insulator sleeve 767 and spacer element 704.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding system comprising:
   a manifold having a melt channel for receiving a melt stream of moldable material;
   a nozzle disposed within an opening in a mold plate and having a melt channel in fluid communication with the manifold melt channel, the nozzle having a first outer diameter that extends along a first length of the nozzle to define a nozzle body portion and a second, reduced outer diameter that extends along a second length of the nozzle to define a spigot portion such that a shoulder is defined between the nozzle body portion and the spigot portion of the nozzle;
   a plurality of nozzle tips radially extending from the nozzle body portion, wherein each nozzle tip is in fluid communication with a respective mold cavity; and
   a spacer element having an upstream surface that contacts and seals against a downstream surface of the manifold and having a downstream end disposed within an annular seat in the mold plate, the spacer element having a bore with at least a first portion having a first inner diameter and a second portion having a second, reduced inner diameter such that a planar surface is defined between the first and second portions of the bore,
   wherein the second outer diameter of the nozzle spigot portion is sized to be slidably received within the spacer element bore second portion such that in the cold condition when the nozzle is fit within the spacer element bore a gap G exists between the shoulder of the nozzle and the planar surface of the spacer element bore, and
   wherein the spacer element and the nozzle tips are axially fixed in position such that under operating conditions thermal expansion of the nozzle is accommodated by the gap.

2. The injection molding system of claim 1, wherein the first outer diameter of the nozzle body portion is sized to be slidably received within the first portion of the spacer element bore.

3. The injection molding system of claim 1, wherein an upstream end of the nozzle spigot portion contacts and seals against the downstream surface of the manifold.

4. The injection molding system of claim 1 further comprising:
   a nozzle heater for heating the melt stream within the melt channel that extends through the nozzle body portion.

5. The injection molding system of claim 4, wherein the nozzle heater includes a heater segment disposed around the nozzle body portion downstream of the nozzle tips.

6. The injection molding system of claim 4, wherein the nozzle heater includes a heater segment disposed within a downstream end surface of the nozzle body portion.

7. The injection molding system of claim 1, wherein a downstream end of the nozzle body portion includes a central locator post that fits within a corresponding recess in the mold plate for aligning the nozzle tips with the mold gates.

8. The injection molding system of claim 7 further comprising:
   an insulative component surrounding the central locator post and positioned between the downstream end of the nozzle body portion and the mold plate.

9. The injection molding system of claim 1 wherein each of the nozzle tips includes,
   a nozzle tip component having a melt channel for delivering the melt stream to the mold gate, and a transfer seal component for retaining the nozzle tip component to the nozzle body portion, wherein the seal component is in contact with the mold plate surrounding the mold gate.

10. The injection molding system of claim 1 further comprising:
a locator sleeve surrounding the nozzle body portion upstream of the nozzle tips, the locator sleeve having a circumferential projection for engaging a second annular seat in the mold plate to fix the axially position of the nozzle tips.

11. The injection molding system of claim 10, wherein each of the radially extending nozzle tips includes threads for engaging with corresponding threads in the downstream end of the nozzle body portion.

12. The injection molding system of claim 10 further comprising:
an insulator ring positioned between the circumferential projection of the locator sleeve and the second annular seat.

13. The injection molding system of claim 1 further comprising:
a biasing member positioned within the gap between the nozzle shoulder and the spacer element annular seat.

14. The injection molding system of claim 13, wherein the biasing member is selected from the group consisting of a bevel washer, a metallic o-ring and a spring.

15. An injection molding system comprising:
a manifold having a melt channel for receiving a melt stream of moldable material;
a nozzle disposed within an opening in a mold plate and having a melt channel in fluid communication with the manifold melt channel, the nozzle having a spigot portion and a nozzle body portion with a radially extended flange portion therebetween, the spigot portion having an upstream segment with a first outer diameter and a downstream segment with a second outer diameter such that a step is defined between the upstream and downstream segments of the spigot portion of the nozzle, wherein the flange portion has a third outer diameter that is greater than the second outer diameter such that a shoulder is defined between the spigot portion downstream segment and the flange portion;
a plurality of nozzle tips radially extending from the nozzle body portion, wherein each nozzle tip is in fluid communication with a respective mold cavity; and
a spacer element having an upstream surface that contacts and seals against a downstream surface of the manifold and a downstream end disposed within an annular seat in the mold plate, the spacer element having a bore with at least a first portion having a first inner diameter, a second portion having a second inner diameter, and a third portion having a third inner diameter such that a first planar surface is defined between the first and second portions of the bore and a second planar surface is defined between the second and third portions of the bore,
wherein the first outer diameter of the nozzle spigot upstream segment is sized to be slidably received within the spacer element bore first portion such that in the cold condition when the nozzle is fit within the spacer element bore a gap G exists between the step of the nozzle spigot portion and the first planar surface of the spacer element bore, and
wherein the spacer element and the nozzle tips are axially fixed in position such that under operating conditions thermal expansion of the nozzle is accommodated by the gap.

16. The injection molding system of claim 15, wherein the second outer diameter of the nozzle spigot downstream segment is sized to be slidably received within the second portion of the spacer element bore.

17. The injection molding system of claim 16, wherein the third outer diameter of the flange portion of the nozzle is sized to be slidably received within the third portion of the spacer element bore.

18. The injection molding system of claim 15, wherein the nozzle body is comprised of a first nozzle body segment having a first nozzle melt channel and a second nozzle body segment having a second nozzle melt channel, wherein the nozzle tips radially extend from the second nozzle body segment.

19. The injection molding system of claim 18, wherein the first and second nozzle body segments are threadably connected.

20. The injection molding system of claim 18, wherein the first and second nozzle body segments are attached by at least one of a press fit, a shrink fit, a brazed connection and a soldered connection.

21. The injection molding system of claim 15, further comprising:
a second gap between the shoulder of the flange portion and the second planar surface of the spacer element bore, wherein a biasing member is positioned within the second gap.

22. The injection molding system of claim 21, wherein the biasing member is selected from the group consisting of a bevel washer, a metallic o-ring and a spring.

23. The injection molding system of claim 21, further comprising:
an insulator piece positioned between the shoulder and the biasing member.

* * * * *

UNITED STATES PATENT AND TRADEMARK OFFICE
CERTIFICATE OF CORRECTION

Page 1 of 1

PATENT NO.      : 7,845,936 B2
APPLICATION NO. : 12/356559
DATED           : December 7, 2010
INVENTOR(S)     : Denis Babin It is certified that error appears in the above-identified patent and that said Letters Patent is hereby corrected as shown below:

In column 9, claim 10, line 10, replace "axially" with -- axial --.

In column 9, claim 13, line 24, replace "annular seat" with -- planar surface --.

Signed and Sealed this
Fifth Day of July, 2011

David J. Kappos
*Director of the United States Patent and Trademark Office*